United States Patent Office 2,736,714
Patented Feb. 28, 1956

2,736,714

LEAD GLASS COMPOSITION

Ralph L. Tiede, Newark, Ohio, assignor to Owens-Corning Fiberglas Corporation, a corporation of Delaware No Drawing. Application January 4, 1952,
Serial No. 265,050

3 Claims. (Cl. 252—478)

This invention relates to a lead glass composition which by reason of its improved properties is advantageously adaptable to the formation of products and especially fiber products, such as filaments, strands, yarns, and the like.

Fibrous lead glass has applications in many fields, including the medical field. A chief use in this case is a fabric prepared from lead glass fibers and manufactured into a garment such as a gown or apron which is worn by physicians and radiologists as a radiation shield against penetrating X-rays or Roentgen rays. Without such a safeguard, these rays have been known to promote leukemia in technologists who are exposed at repeated intervals. In a similar manner, such a gown or apron also affords protection against the beta rays of atomic fission products.

Another useful application of lead glass fibers in the medical field is in making "rayable" gauzes which provide a safety factor in surgical operations. Usually, a tracer strand of lead glass is woven into a conventional surgical sponge. Upon X-raying such a sponge, the lead glass strand casts a "shadow" since it is opaque to the X-rays, or, as it is more commonly called, radiopaque. Consequently, as in the case of a confusing post-operative complication, the possibility of the presence of a sponge within the patient may be readily detected by X-ray pictures.

Still another use of lead glass fibers is in a dental mixture designed as a temporary filling material and base. Lead glass strands, usually hammer milled, are mixed, for instance, with zinc oxide, zinc acetate, eugenol, and white rosin. The mixture is placed into a tooth cavity and, after a few minutes, sets to a dense filling. Because of the radiopaque nature imparted to the mixture by the lead glass strands, the filling serves as a contrast medium when verifying the area for the presence of residual caries. Much in the same manner, a lead glass strand or yarn may be used to fill root canals of teeth. In this case, the strand or yarn is manipulated by working it into the canal using a cut length. The stages of canal filling can be verified by X-ray recording, as before, because of the "shadows" cast by the radiopaque strand.

A still further use of lead glass strands is in the manufacture of catheters, especially catheters for children, where the catheter tip comprises a tracer lead glass strand in combination, as by braiding, with other strands such as nylon (polyamides). Accordingly, the passage of the catheter, as into blood vessels, and its path of travel may be detected by X-rays, for example, in conjunction with a florescent screen.

The art of forming vitreous products such as lead glass products is fraught with many problems, not the least by far being the attaining of a workable molten vitreous mass which has properties facilitating the steps of the process to which it is subjected. The shortcomings of such vitreous masses are peculiarly magnified and accordingly more serious in the art of forming fibers therefrom.

As compared to some forming operations involving a molten vitreous or siliceous mass wherein relatively large amounts of the mass are molded or cast, in a fiberizing step each minute portion of the molten mass is individually dealt with; each minute portion is converted into fibers each having an enormous surface area as compared to its volume. Consequently, in these cases physical properties of the molten mass are even more important.

Some of the properties which are particularly important when a molten vitreous or siliceous mass such as glass is to be converted into fibers are the liquidus temperature of the glass and its viscosity properties which largely determines its operating temperature, that is, the temperature at which it is fiberized. Hereafter, the term "operating viscosity" is taken to mean a viscosity of the glass which is suitable for fiberizing it as hereafter described.

It will be apparent that a vitreous mass must be maintained above its liquidus temperature to provide a uniformly homogeneous mass which may be safely processed as by fiberization without devitrification of any part.

On the other hand, the viscosity of a glass melt is extremely important in a fiberizing step. If the viscosity is too low, the glass becomes excessively fluid and may flood across the bottom of a feeder plate instead of flowing through the orifices of the plate as streams which may be effectively attenuated into fibers or filaments in accordance with methods known in the art. If the viscosity is too high, the glass is worked only with the greatest difficulty and the glass streams solidify almost immediately after leaving the orifices of a feeder or similar apparatus. It is, therefore, extremely difficult to attenuate such streams into the desired fibers. Further, those fibers that are produced from a glass having a high viscosity tend to be more brittle.

In the making of glass fibers, experience has shown that a melt has a viscosity best suited for fiberizing at a temperature which is dangerously close to the liquidus or devitrification temperature. Accordingly, it is not uncommon in such an instance to have the discharge ends of the feeder orifices, through which the streams flow, at a temperature actually below the liquidus temperature of the glass in order to realize a proper glass viscosity.

As fibers are formed from streams flowing from a feeder, they cool and solidify very quickly due mostly to their great surface area per unit weight. The danger, then, in operating so closely to the liquidus temperature as described is that the glass, while still fluid, may fall below this temperature in the fiber-forming zone and undergo devitrification, thereby interfering both with the efficiency of the process and the quality of the product. The net result may be inferior, brittle fibers containing perhaps even devitrified spots. To avoid this, it may be necessary to operate at a temperature higher than that corresponding to the proper viscosity even though it means working with the melt at too low a viscosity and creating additional technical problems that such changes in operating conditions entail.

This problem appears to be especially acute in the fiberization of lead glass melts. Indeed, in converting to fibers one popularly used lead glass composition, the temperature of the feeder orifices is maintained at about 150° F. below the actual liquidus temperature of the glass.

It will be apparent from the foregoing that, other properties remaining substantially the same, an improved glass composition can be realized from the standpoint of forming products therefrom, especially glass fibers, if the liquidus temperature can be lowered, or the temperature of the operating viscosity raised, or both. In such a case, the increased difference or "spread" between the liquidus temperature and the temperature of the operating viscosity greatly diminishes the dangers of devitrification. Further, such a glass does not require as critical a control as other glasses, and its operation is much smoother with attendant advantages as in the quality of the products formed, and the like.

A leading object of the present invention is to provide a lead glass composition that is advantageously adaptable to the formation of products and especially fiber products.

Another object is to provide a lead glass composition having a lower liquidus temperature than ordinarily found.

A further object is to provide a lead glass composition having a higher operating temperature as dictated by its viscosity properties than ordinarily found.

A still further object is to provide a lead glass composition having improved durability to attack from water and moisture vapor.

More specific objects and advantages are apparent from the following description which merely discloses and illustrates the invention and is not intended to limit the claims.

All the above objects are readily met by a composition having substantially these limits:

| | Weight percent |
|---|---|
| $SiO_2$ | 30.0–37.0 |
| PbO | 57.0–65.0 |
| $Al_2O_3$ | 2.00– 5.0 |
| Alkali oxide | 1.5– 7.0 |

The alkali oxide may be an oxide of an alkali metal found in group I of Mendeleeff's Periodic Table. The alkali oxides usually employed are sodium oxide and potassium oxide.

A specific example of a glass of the present invention which has been found to be very satisfactory is:

| | Weight percent |
|---|---|
| $SiO_2$ | 34.3 |
| PbO | 59.1 |
| $Al_2O_3$ | 3.0 |
| $K_2O$ | 3.6 |

The theoretical reasons why the compositions disclosed result in a lead glass having the desired improved properties are not exactly known. However, the addition of alumina and preferably in substitution for some of the alkali oxide otherwise employed is thought to be highly contributory to these properties and representable of one of the novel features of the present glass.

With respect to the allowable composition ranges first presented, if more silica is used, the liquidus temperature is raised, while if less than the minimum amount is employed, the durability properties are affected adversely.

If less than 2% alumina is used, there is not a sufficient lowering of the liquidus temperature. On the other hand, if more than 5% is employed, a tendency toward devitrification is introduced. When more than 65% lead is used, the advantages contributed by the other ingredients are decreased and, additionally, the composition loses some of its durability. If less lead is used than the indicated minimum amount, the glass tends to lose its radiopaque properties. An increase of alkali oxide over its allowable maximum amount results in a loss of durability to attack by water and acid, while an alkali oxide content below 1.5% does not provide a desirable amount of fluxing action in fusing a mixture of the present invention.

The present glass has a lower liquidus temperature and a higher temperature at an operating viscosity than ordinarily found in other lead glasses. For example, in one case the liquidus temperature is about 220° F. below the temperature of the feeder orifices. Accordingly, the liquidus temperature is sufficiently below the operating temperature at which products are formed to prevent devitrification. Rapid cooling, automatically realized in the case of fine fibers, preserves the vitreous nature of the products through the devitrification temperature range. Consequently, the instant glass is advantageously adaptable to the formation of products and especially to the formation of fibers. Additionally, the present glass also possesses an improved durability to attack from water and moisture vapor that customarily found in lead glasses.

While a glass made in accordance with the present invention may be formed, if desired, into the usual pressed, blown, cast, rolled, or extruded objects commonly found in the art, it finds chief application in the manufacture of fibers, filaments, strands, yarns, and the like. Many methods for converting molten glass to a fibrous form are known in the art, but, for purposes of illustration, two methods which may be employed are those disclosed in U. S. Patents 2,234,986 and 2,300,736, both issued to Slayter and Thomas.

Glass fibers produced by these methods may also be successfully fabricated to strands, twisted yarns, ply yarns, and then interwoven, matted, or braided in various textiles, such as fabrics, as disclosed, for example, in U. S. Patent 2,133,238 to Slayter and Thomas. The cited patents are hereby incorporated by reference into the present disclosure for purposes of illustration.

Various modifications and changes may be made in the present invention within the spirit and scope of the appended claims.

I claim:

1. A glass having substantially the following composition:

| | Weight percent |
|---|---|
| $SiO_2$ | 30.0–37.0 |
| PbO | 57.0–65.0 |
| $Al_2O_3$ | 2.0– 5.0 |
| Alkali metal oxide | 1.5– 7.0 |

2. A composition of matter advantageously adaptable to the formation of fibers substantially consisting of:

| | Weight percent |
|---|---|
| $SiO_2$ | 30.0–37.0 |
| PbO | 57.0–65.0 |
| $Al_2O_3$ | 2.0– 5.0 |
| Alkali oxide | 1.5– 7.0 | said alkali oxide being selected from the group consisting of sodium oxide and potassium oxide.

3. A radiopaque fiber comprising:

| | Weight percent |
|---|---|
| $SiO_2$ | 34.3 |
| PbO | 59.1 |
| $Al_2O_3$ | 3.0 |
| $K_2O$ | 3.6 |

References Cited in the file of this patent

UNITED STATES PATENTS

| 1,943,051 | Berger | Jan. 9, 1934 |
| 2,431,980 | Armistead | Dec. 2, 1947 |
| 2,528,634 | Armistead | Nov. 7, 1950 |
| 2,623,549 | Archer | Dec. 30, 1952 |

FOREIGN PATENTS

| 2,537 | Great Britain | of 1855 |